United States Patent [19]

Arnold et al.

[11] 4,319,446
[45] Mar. 16, 1982

[54] INFEED MEANS FOR ROUND BALER

[75] Inventors: John Arnold, Coldwater; Wilbur E. Groeneveld, Celina; Warner Heckley, Rockford, all of Ohio

[73] Assignee: The Paul Revere Corporation, Greenwich, Conn.

[21] Appl. No.: 162,372

[22] Filed: Jun. 23, 1980

[51] Int. Cl.³ .............................................. A01D 39/00
[52] U.S. Cl. ......................................... 56/341; 100/88
[58] Field of Search ............................ 56/341; 100/88

[56] References Cited

U.S. PATENT DOCUMENTS

| | | | |
|---|---|---|---|
| 3,895,573 | 7/1975 | Phillips et al. | 56/341 |
| 3,914,926 | 10/1975 | Braunberger et al. | 56/341 |
| 4,119,026 | 10/1978 | Sacht | 56/341 |
| 4,205,514 | 6/1980 | Wolrab | 56/341 |

*Primary Examiner*—Jay N. Eskovitz
*Attorney, Agent, or Firm*—Robert J. McNair; Abraham Ogman

[57] ABSTRACT

This invention relates to the inlet throat of a machine for forming large round bales of fibrous agricultural material. The machine includes a single axle chassis and a tongue enabling it to be towed along a windrow by a tractor. On top of the chassis is a generally cylindrical housing containing a baling chamber of fixed size having a horizontal axis. Around the periphery of the baling chamber is a plurality of serially arranged conveying elements. The rear portion of the housing swings upward from a hinge point at the top to enable rearward discharged of a completed bale. A pickup mechanism is transversely mounted across the lower front of the chassis. Behind the topside of the pickup mechanism there is a conveyor which forms the bottom of the front part of the baling zone. The conveyor consists of a plurality of side-by-side belts entrained on four parallel rollers which extend horizontally across the entire bottom of the machine. The rollers are fixedly journalled to the housing frame with the three rearmost rollers being generally on the circumference of the baling zone and the front roller positioned such that a plane tangent with the top of both the pickup reel and the top of the middle roller will also pass tangentially across the top of the front roller.

4 Claims, 4 Drawing Figures

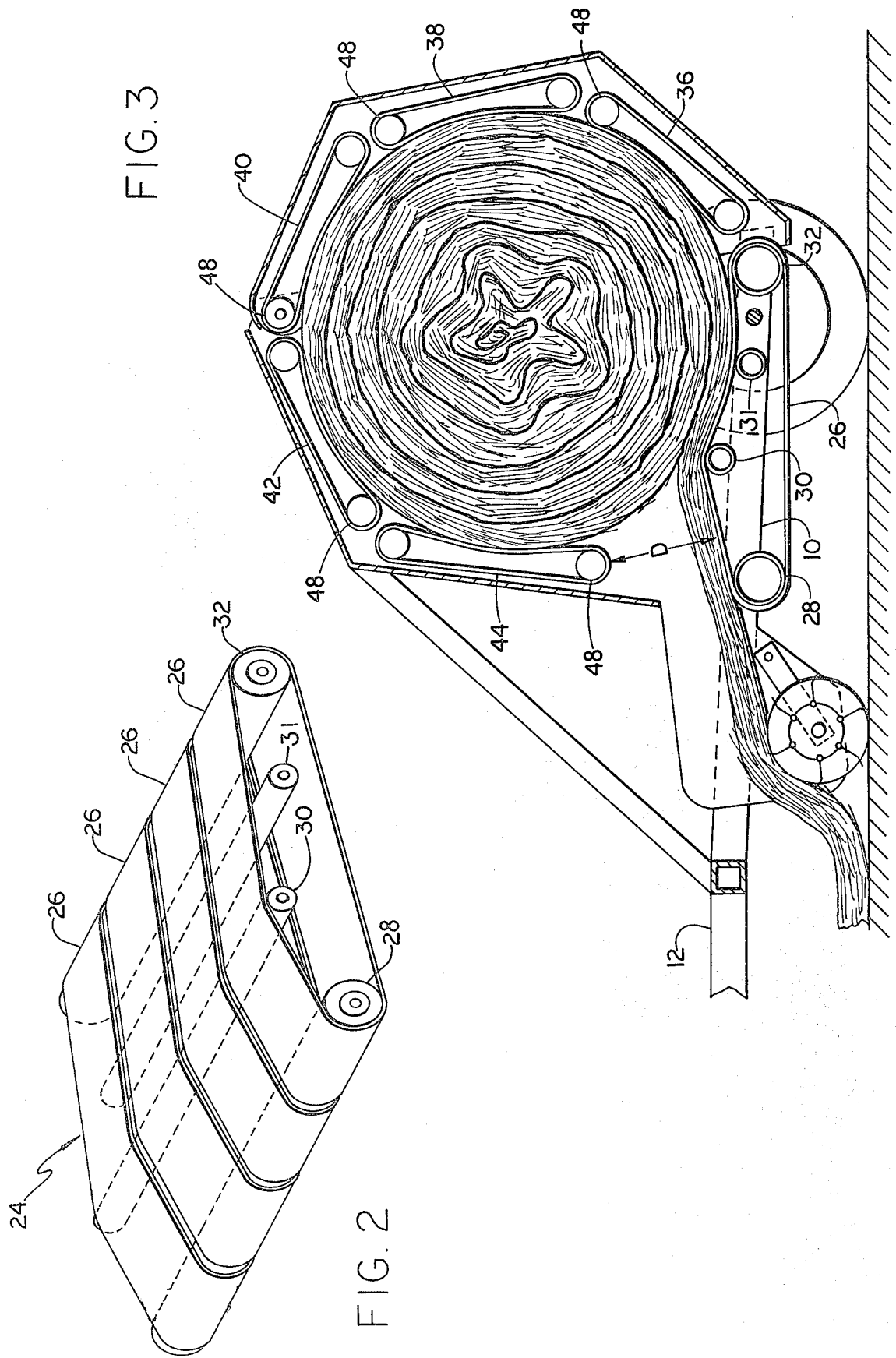

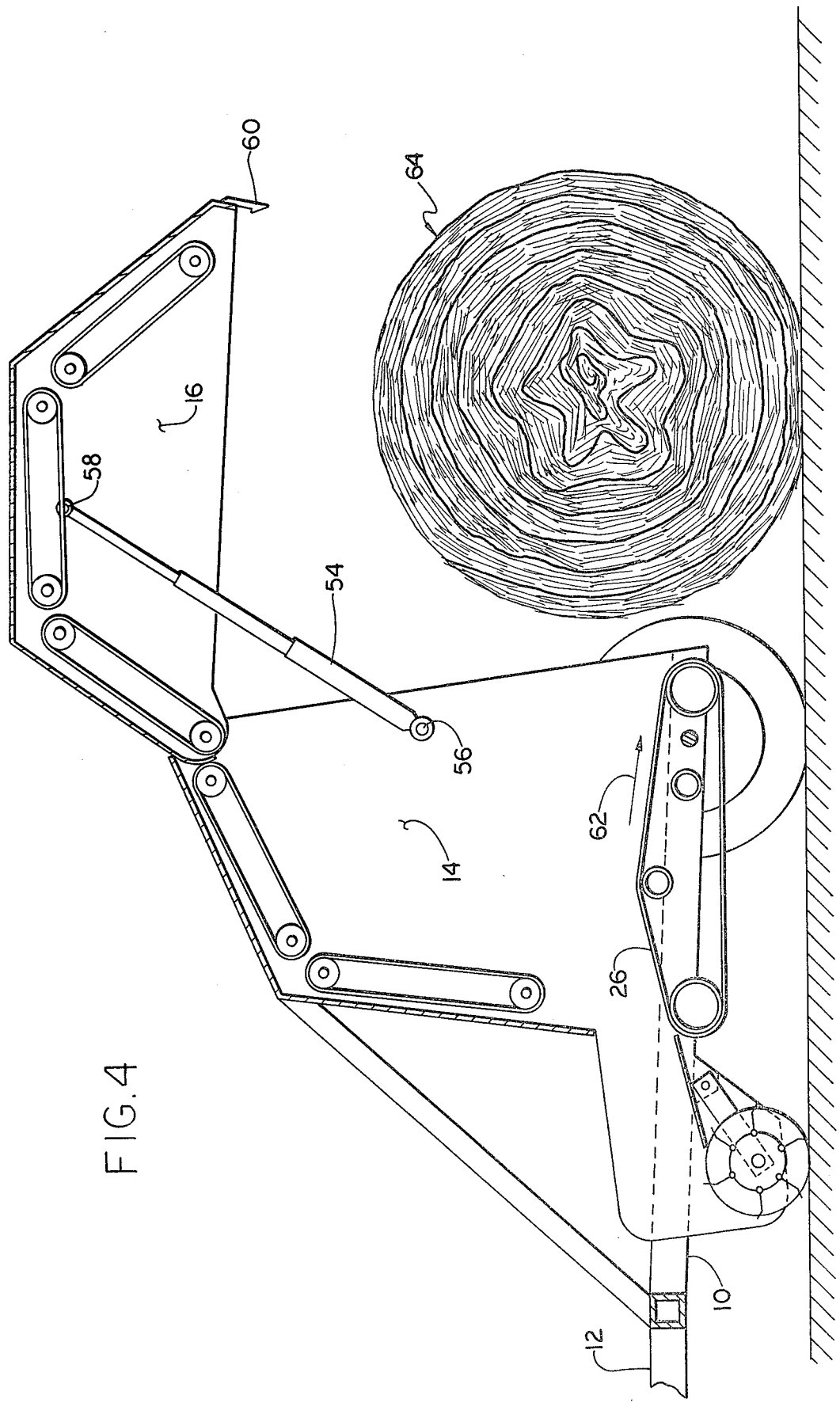

INFEED MEANS FOR ROUND BALER

DESCRIPTION

1. Background of Prior Art

This invention relates to the inlet throat of apparatus for forming large round bales from loose crop material such as hay or the like.

Over the last several decades automatic type balers have been used that form the hay into small wire or twine tied balse. Both round and rectangular bale forming machines exist in the prior art. In recent years apparatus for forming hay into large round bales has been introduced.

The U.S. Pat. No. 3,722,197 to Vermeer is typical of the prior art machines for forming bales which weigh a ton or more. The machine of Vermeer has a portable frame provided with a pickup device for gathering and delivering windrowed material onto a rearwardly moving horizontal belt conveyor. Cooperating with the horizontal conveyor is a continuous belt assembly which, in combination with the horizontal conveyor, forms a baling zone. As the bale within the baling zone increases in size, the continuous belt assembly adapts to progressively extend about the bale. After a predetermined size bale is formed, it is released onto the field and the process repeated.

The U.S. Pat. No. 4,009,653 to Sacht discloses a second method for forming large round bales. The Sacht machine comprises a cage-like frame having a horizontal axis and a generally cylindrical shaped baling zone. Upwardly extending machine sidewalls form the confining end surfaces of the baling zone. A plurality of serially arranged conveying elements enclose and generally define the circumferential periphery of the baling zone. Thus, the size of the baling chamber remains constant during the bale forming process. To accomplish discharge of a completed bale, the baling chamber is divided into two portions approximately along a vertically extending axis cutting plane. The rear portion of the housing is then configured to swing upward from a hinge point at the top, thereby allowing the bale to be discharged rearward.

The U.S. Pat. No. 4,022,003 to Strausser et al discloses a mechanism for picking up crop material, forming a large round bale, twine wrapping the bale and discharging it as the machine is continuously moving across the field. This is accomplished by the use of front and rear baling regions. Formation of a crop material roll is initiated in the front region and completed in the rear region after the roll has been partially formed in the front region and transferred to the rear region when it reaches a preselected minimum diameter. Starting the roll formation in the front region allows the completed bale to be wrapped with twine and discharged while crop material continues to be picked up by the machine as it advances along the windrow without having to be stopped.

Our invention comprises improvements on the Sacht machine. The inlet throat of a machine built according to the disclosure of Sacht has a bottom conveyor member for receiving the agricultural material as it enters the baling zone from the pickup mechanism. The bottom conveyor was comprised of a first roller located in front of the baling zone having a horizontal axis, a second roller near the rear of the baling zone and a plurality of laterally spaced belts trained over the first and second rollers. Both the first and second rollers were fixedly journalled to the frame. Both rollers were disposed so as to be generally on the cylindrical periphery of the baling zone.

BRIEF SUMMARY OF THE INVENTION

With our invention the implementation of the bottom conveyor differs from the teaching of Sacht. We add rollers between the front and rear bottom conveyor of Sacht. In our implementation, the front roller is fixedly journalled at a lower position on the frame than was possible when using only two rollers. As viewed from the side, our implementation will show four rollers on which a plurality of laterally spaced belts are trained. The second and third rollers (which are respectively in the forward and aft portions of the conveyor midsection) and the fourth roller (which is at the rear of the machine) are disposed to be generally on the cylindrical periphery of the baling zone. The first roller is in front of and somewhat below the plane containing the axis of the second roller.

Our invention accomplishes two things. First, the vertical dimension of the entrance throat is enlarged. This allows the baler to operate in a heavier stand of hay without becoming clogged.

Second, by lowering the placement of the front roller, a pickup reel of smaller diameter can be used. This permits the flow of hay being picked up from the windrow to pass into the baling zone without undergoing abrupt changes in direction. The laterally spaced conveyor belts accept the crop material being passed on from the pickup reel and frictionally engage the crop strands to provide inward directed pressure to carry them into the baling zone.

BRIEF DESCRIPTION OF THE DRAWINGS

FIG. 2 is an isometric view of the three rollers and a plurality of laterally spaced belts which in combination make up the bottom conveyor.

FIG. 3 is a side elevational view of the apparatus showing a fully formed bale within the baling zone.

FIG. 4 is a side elevational view from the left showing the open condition of the machine.

DETAILED DESCRIPTION OF THE INVENTION

Figure 1:
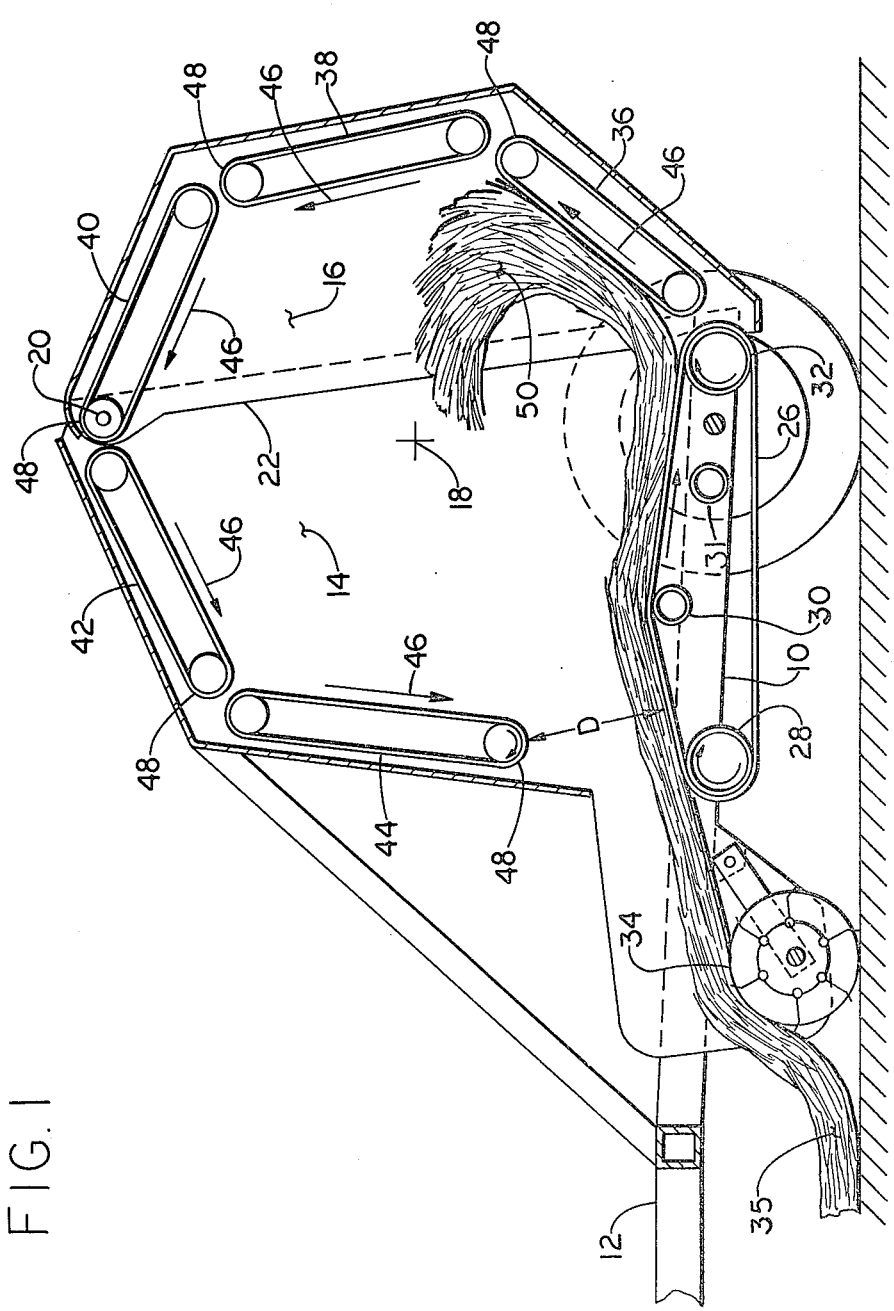
FIG. 1 is a side elevational view of the apparatus showing the arrangement of the endless conveyor means around the periphery of the baling zone.

In FIG. 1, a machine is shown in cutaway view which forms large round bales from fibrous material gathered from a windrow. The FIG. 1 machine comprises a single axle chassis 10 having a tow bar tongue 12 extending out the front for attachment to a tractor or similar vehicle. The upper structure is comprised of skeletal members onto which sheets of metal are secured. There is a front part 14 and a rear part 16. Together, they form a horizontal, generally cylindrical baling zone having a central axis 18. Rear part 16 is hinge mounted to front part 14 by means of a pivot bearing 20. This allows the rear part 16 of the baler to be swung upward approximately 90 degrees when discharging a completed bale (See FIG. 4).

There are sidewalls at the end of the baling zone which limit the length of the formed bale. The sidewall portions on the front and rear parts 14 and 16 juxtapose such that they meet along line 22 (See FIG. 1).

FIG. 2 shows the conveyor 24 which forms the bottom of the front part 14. Conveyor 24 is comprised of a plurality of side-by-side belts 26 which are carried over rollers 28, 30, 31 and 32. In the unit reduced to practice five belts 26 were used, however, only four are shown in FIG. 2. As can be seen in the side view of FIG. 1, rollers 28, 30, 31 and 32 are arranged so that they have a generally triangular configuration. Rollers 30, 31 and 32 are generally on the circumference of the cylindrical shaped baling zone with each roller being the same distance from axis 18. This means that belts 26 come in contact with third roller 31 only when there is the weight of a sizably formed bale on bottom conveyor 24. Front roller 28 is mounted lower in the frame being positioned such that a line drawn tangent with the top of pickup reel 34 and the top of a second roller 30 will also pass tangentially across roller 28. This assures that crop material picked up from windrow 36 will have a straight run from the top of pickup 34 into the baling zone.

Above the bottom conveyor 24 is a series of independent conveying elements which surround the generally cylindrical baling zone. Conveying elements 36, 38 and 40 are mounted in the rear part 16 and conveying elements 42 and 44 are mounted in the front part 14. Each of the five serially arranged conveying elements 36–44 consists of an upstream and a downstream roller over which is entrained a multiplicity of side-by-side belts. All belts run in the direction shown by the arrows 46. All rollers are journalled for rotation in the sidewalls of the machine. The central shaft of each downstream roller 48 extends through the sidewall on the left side of the machine and each shaft has a sprocket gear mounted thereon (not shown). A chain drive is then entrained over the sprockets so that all conveying elements are energized by the power take-off of the tractor to achieve the motion designated by arrows 46.

As the FIG. 1 baling machine is drawn by a tractor along windrow 36, the clockwise rotating pickup reel 34 begins to deliver crop material to that portion of side-by-side belts 26 which stretch from front roller 28 to second roller 30. The rearward moving upper portion of belts 26 carry the crop material through inlet gap "D" and into the baling zone. When the crop material (designated 50 in FIG. 1) reaches the rear of the baling zone it is carried upward by conveying element 36. As the crop material moves upward, the initially fluffy mass will tend to fall forward as depicted in FIG. 1. As more crop is taken in through inlet "D" the baling zone will fill with a loosely formed roll which is evenly distributed over the entire chamber.

When the roll has achieved the same size as the baling zone, and additional material is taken in from the windrow, the configuration shown in FIG. 3 pertains. New material enters along the periphery of the baling zone, compressing the material in the bale more and more towards the center. The inner layers within the bale fold inward, collapsing in a stellate manner. That portion of the conveying element belts which is between the upstream and downstream rollers (conveying elements 36, 38, 40, 42 and 44) assumes the curved configuration of the cylindrical shaped bale. Thus, the belts make good contact with the bale causing it to rotate counterclockwise as viewed in FIG. 3. After the bale reaches a preselected compressed density, the tractor will be stopped and the finished bale tied, by introduction of twine from a tying mechanism (not shown). The tied bale can then be discharged by opening the rear part 16.

Opening of the rear part 16 is achieved by use of a hydraulic cylinder 54 on each sidewall of the machine. The hydraulic cylinder 54 is journalled at the ends by pins 56 and 58, pin 56 being anchored to the sidewall of front part 14 and pin 58 being anchored to the sidewall of back part 16. Hydraulic fluid to actuate cylinder 54 was supplied by the tractor in the implementation reduced to practice. A mechanically actuated locking hook 60 must be released before the hydraulic cylinder 54 can extend. Locking hook 60 is journalled to the lower rear side of rear part 16 and enables the front and rear parts to be locked together during the bale forming sequence.

The completed bale 62 is ejected from the baling chamber by the rearward movement of conveyor belts 26 (see arrow 62). In the machine reduced to practice, the completed bales 62 weighed from 1500 to 1800 lbs.

Our invention improves on the teaching of Sacht in that the bale forming apparatus operates more reliably in all sorts of crop conditions. A machine built in accordance with the teaching of Sacht would have front roller 28 raised so that rollers 28, 30, 31 and 32 were in line. Raising of front roller 28 significantly narrows inlet dimension "D" (See FIG. 1). By lowering the front roller to the position shown in FIG. 1, several benefits result. Firstly, the widened inlet throat can handle heavy bulges in the windrow caused when luxuriant growths of hay occur. Secondly, it will be noted that the belts following around the most downstream roller 48, (immediately above roller 28) rotates clockwise. This means that the belting on roller 48 rotates in a direction which is opposite to that desired for the crop material passing through the inlet into the baling zone. By using the generally triangular roller configuration shown in FIG. 1, there is an opportunity for an appreciable length of belting to frictionally urge the crop strands to enter the baling zone. This includes that portion of belting 26 which extends between rollers 28 and 30.

By using a straight-line path from the top of pickup assembly 34 to the top of roller 30, applicants found that the crop material strands are arranged into an orderly mat which does not tend to plug the entrance throat. Addition of third roller 31 helps prevent stretching of belts 26. It will be appreciated by those skilled in the art that there is some tendency for the rotating bale to bulge out in throat region "D" rather than stay at the same radius as depicted in FIG. 3. With applicants configuration, the new crop material being picked up from the windrow is fed into the baling zone below the bulge in the bale which occurs just downstream from the end of conveying element 44 (The bale has a tendency to bulge since there is no inward pressure being exerted in the throat region).

While the specific embodiment of the invention has been shown and described in detail, it will be understood that the same inventive principles would apply for implementations wherein other than flexible belts were used as crop contacting conveying elements.

We claim:

1. A machine for forming round bales of fibrous crop material gathered from a windrow, comprising:

a single axle chassis;

skeletal frame members attached to the chassis and defining a horizontal generally cylindrical baling zone, said frame including a pair of upwardly extending sidewalls spaced apart in the horizontal direction to form the two ends of the baling zone, said frame including a stationary front part and a rear part hinge mounted to said front part on the upper portion of said sidewalls so as to form a tailgate which can be swung upward from a closed to an open position for discharge of a completed bale;

pickup reel means transversely mounted across the lower front of said chassis;

bottom conveyor means extending between said sidewalls for receiving crop material from said pickup reel and delivering it to said baling zone, the rearmost portion of said bottom conveyor defining the lower side of said baling zone;

a plurality of serially arranged conveying elements disposed around the periphery of the upwardly extending sidewalls, some of said conveying elements being in said hinge mounted rear part, said conveying elements being disposed around the circumferential periphery of the generally cylindrical baling zone;

drive means for moving both the bottom conveyor and said serially arranged conveying elements, the direction of movement being from front to rear through the bottom of said baling zone, thence such as to carry crop material upward along the rearmost side; and an inlet gap into the baling zone extending transversely between said sidewalls, said gap being between said bottom conveyor and the downstream edge of the last serially arranged conveying element, the bottom conveyor being arranged to provide a straight-line path from the top of said pickup reel to the forward lower edge of said baling zone, said bottom conveyor extending beyond the forward entrance to said baling zone and providing thereby frictional urging of the crop strands to enter said baling zone, the height of said inlet gap being selected to minimize plugging of the entrance region.

2. The invention as defined in claim 1 wherein there are at least four side-by-side belts in the bottom conveyor.

3. The invention as defined in claim 1 and including a third roller between said second and rear rollers, said third roller being parallel to said rear roller and extending across the bottom of said baling zone, said third roller being fixedly journaled in said frame members at a location to define the central lower edge of said baling zone.

4. The invention as defined in claim 1 wherein the bottom conveyor means includes:

a rear roller extending horizontally across the bottom of the baling zone and fixedly journaled at its ends to the frame members, said rear roller being positioned at the lower rear edge of said front part at a location generally on the circumference of said baling zone;

a second roller parallel to said rear roller and extending across the bottom of said baling zone, said second roller being fixedly journaled in said frame members and defining the forward lower edge of said baling zone;

a front roller parallel to and the same length as said rear roller, said front roller being fixedly journaled in said frame member at a position in front of and sufficiently below said second roller to enable the uppermost edge of said front roller to lie in a plane containing the top edges of said pickup reel and said second roller; and a plurality of side-by-side belts entrained over said rear, second and front rollers, each belt forming in side view a generally triangular configuration.

* * * * *

UNITED STATES PATENT AND TRADEMARK OFFICE
CERTIFICATE OF CORRECTION

PATENT NO. : 4,319,446

DATED : March 16, 1982

INVENTOR(S) : John Arnold et al

It is certified that error appears in the above-identified patent and that said Letters Patent are hereby corrected as shown below:

Column 1, line 11, please change "balse" to ---bales---

Signed and Sealed this

Twenty-fourth Day of August 1982

|SEAL|

Attest:

GERALD J. MOSSINGHOFF

*Attesting Officer*  *Commissioner of Patents and Trademarks*